United States Patent [19]

Sugiyama et al.

[11] Patent Number: 5,057,466
[45] Date of Patent: Oct. 15, 1991

[54] DIELECTRIC CERAMIC MATERIAL AND METHOD OF PRODUCING SAME

[75] Inventors: Masaaki Sugiyama; Takayuki Inuzuka; Hiroshi Kubo, all of Kawasaki, Japan

[73] Assignee: Nippon Steel Corporation, Tokyo, Japan

[21] Appl. No.: 483,463

[22] Filed: Feb. 22, 1990

[30] Foreign Application Priority Data

Feb. 23, 1989 [JP] Japan ............................ 1-41653
Oct. 25, 1989 [JP] Japan ............................ 1-275946

[51] Int. Cl.$^5$ ............................................ C04B 35/04
[52] U.S. Cl. ............................................. 501/135
[58] Field of Search ................................... 501/135

[56] References Cited

U.S. PATENT DOCUMENTS

| | | | |
|---|---|---|---|
| 4,121,941 | 10/1978 | Kawashima et al. | 501/135 |
| 4,487,842 | 12/1984 | Nomura et al. | 501/135 |
| 4,585,744 | 4/1986 | Konoike et al. | 501/135 |

FOREIGN PATENT DOCUMENTS

| | | | |
|---|---|---|---|
| 3444340 | 6/1985 | Fed. Rep. of Germany | 501/135 |
| 60-68503 | 4/1985 | Japan . | |
| 60-124305 | 7/1985 | Japan . | |
| 61-142602 | 6/1986 | Japan | 501/135 |
| 62-170102 | 7/1987 | Japan . | |
| 63-37508 | 2/1988 | Japan . | |

*Primary Examiner*—Mark L. Bell
*Attorney, Agent, or Firm*—Wenderoth, Lind & Ponack

[57] ABSTRACT

A dielectric ceramic material essentially consists of a complex perovskite compound mainly composed of $Ba(Mg_{\frac{1}{3}}Ta_{\frac{2}{3}})O_3$ phase and 0.005 to 1.0% by weight of phosphorus with reference to the complex perovskite compound.

As one of the dielectric properties, the unloaded Q value reaches 37000 at a measuring frequency of 10 GHz and the temperature coefficient of the resonant frequency is about 4 ppm/°C.

10 Claims, 1 Drawing Sheet

DIELECTRIC CERAMIC MATERIAL AND METHOD OF PRODUCING SAME

BACKGROUND OF THE INVENTION

1. Field of the Invention

The present invention relates to a dielectric ceramic material for use in a high-frequency wave region and a method of producing the same, and more particularly, to a dielectric ceramic material having a high Q value and good temperature stability, which can be effectively used as a dielectric resonator, and a method of producing same.

The dielectric ceramic materials are widely used as dielectric resonators in microwave and millimeter wave, frequency The dielectric resonators are elements of micro, millimeter wave components such as dielectric filters and dielectric resonator stabilized oscillators. As examples of their recent application, there are antenna band pass filters, narrow band filters, and dielectric local oscillators of SHF-TV converters.

To replace metal cavity resonators by ceramic dielectric resonators, it is possible to reduce their dimensions which results in light weight and low cost, because the permittivity of such ceramics is higher than that of air. Especially, the application of dielectric ceramic materials with high Q values to the dielectric resonators is of great advantage to ensure high frequency stability and good noise characteristics of the microwave components.

The band pass and band stop filters and the local oscillators are used as transmitting and receiving components for the electric wave in broadcasting or communication satellites system, and further, in radar and telecommunication systems. As an example of another application, since the dielectric ceramic material has a relative permittivity which is twice or more than that of alumina and has a relative frequency stability of a few ppm/°C., the material can be applied to a substrate material for microwave integrated circuits.

2. Description of the Related Art

A dielectric ceramic material used as a dielectric resonator in a high frequency wave region must have small dielectric losses whose magnitude is determined by the loss factor tan δ, where δ is the loss angle of the material. In resonators the dielectric loss is expressed in the Q-factor, which is defined as the reciprocal of the loss factor. Especially, when the dielectric resonator is not terminated by the load, the Q-factor is called an unloaded Q. The magnitude of the unloaded Q is strongly dependent on properties of the material, and must be kept as large as possible. The large Q value of materials enables a local oscillator to stabilize a frequency load change or a frequency voltage change. Further, use of a high Q material enables the design of a high-power oscillator and narrower band pass or stop filters. The temperature coefficients for the resonant frequency of dielectric resonators must be within a few ppm/°C., in order to stabilize the band frequency of filters and the constant frequency of oscillators for service conditions.

Since the cavity resonator at the same frequency and height/diameter ratio is about $\sqrt{\epsilon_r}$ times as large as the dielectric resonator, the relative permittivity $\epsilon_r$ of the material must be high, to keep the dimensions of the resonator within resonable limits.

As dielectric ceramic material, $Ba(Zr, Zn, Ta)O_3$, $BaO-TiO_2$, $ZrO_2-SnO_2-TiO_2$ or $Ba(Zn, Ta)O_3-Ba(Zn, Nb)O_3$, etc., are well known. Such dielectric ceramic materials have relative permittivities of about 20 to 90, and Q values of 3000 to 10000, and temperature coefficients of ±10 ppm/°C. or less at a frequency of 10 GHz.

Due to recent developments in communication techniques, however, a material with a higher Q value is desired in dielectric resonators, in order to realize the narrower frequency band in band pass/stop filters or the use of higher frequency band more than 10 GHz. The latter requirement is based on the property expressed by $f \cdot Q =$ const, that is, even in a similar device, with the increase of resonant frequency, the Q-factor is degraded in dielectric resonators.

As a material having a high Q value, a $Ba(Mg_{\frac{1}{3}}Ta_{\frac{2}{3}})O_3$ material has been disclosed in Japanese Unexamined Patent Publication (Kokai) No. 62-170102. It is reported that this material has a high value, i.e., 34000, at 10 GHz and a sintering density of 95% obtained by a two step heating treatment, which consists of rapid sintering with a high heating rate (the first step of the heat treatment) and next annealing in an oxygen atmosphere (the second step).

This production process of $Ba(Mg_{\frac{1}{3}}Ta_{\frac{2}{3}})O_3$, compound is, however, based on the rapid sintering method, in which the heating rate is about 1600° C./min. Furthermore, an oxygen atmosphere is required during the second step of the heat treatment. From the view points of responsibility and production costs many problems will occur in actual manufacturing.

On the other hand, as is well known, a $Ba(Sn, Mg, Ta)O_3$ dielectric ceramic material is disclosed in Japanese Unexamined Patent Publication (Kokai) No. 60-124305, a $Ba(Zn, Mg)(Nb, Ta)O_3$ dielectric ceramic material is disclosed in Japanese Unexamined Patent Publication (Kokai) No. 60-68503, and a $(Ba, Sr)(Mg, Ta)O_3$ dielectric ceramic material is disclosed, in Japanese Unexamined Patent Publication (Kokai) No. 63-37508, in which the sintering has been done in air with a normal heating rate such as 200° C./min. Such dielectric ceramic materials, in which various additives are used, have been improved their sintering properties, but the Q values thereof are about 10000, which is not high enough.

SUMMARY OF THE INVENTION

An object of the present invention is to provide a dielectric ceramic material having a high Q value and a small temperature coefficient of the resonant frequency, at the micro, millimeter wave frequency band.

The first step of the present invention is to develop a composition with high Q values, based on the $Ba(Mg_{\frac{1}{3}}Ta_{\frac{2}{3}})O_3$ high Q dielectric compound, because compound is known as a material sintered only by rapid heating process. Thus, the object is to discover the composition and suitable processing technique, by which well densified sintered bodies are fired under the conventional sintering conditions in an air furnace.

A further object of the present invention is to develop a method of production of the above-mentioned dielectric ceramic material with exclusively high Q value.

Based on these requirements, the details of the present invention are explained.

The present invention requires that the dielectric ceramic material is composed of $Ba(Mg_{\frac{1}{3}}Ta_{\frac{2}{3}})O_3$ based complex perovskite compound including phosphorous in an amount from 0.005 to 1.0% by weight.

The present invention also provides that the production methods of the dielectric ceramic material are described by the following steps;

(a) weighing out the required amount of such compounds as carbonate or oxide containing barium, magnesium and tantalum, in order to mainly get a $Ba(Mg_{\frac{1}{3}}Ta_{\frac{2}{3}})O_3$ compound by calcining, (b) before or after calcination, adding phosphorus in an amount from 0.005 to 1.0% by weight in the form of phosphorus compounds to the powder, (c) calcining, and pressing the powder to obtain a green body of the desired shape, and (d) sintering the green body using a conventional heating rate, not a rapid heating rate, in an air furnace.

In the above process, it is possible that the phosphorus mixed with the starting raw material in the form of a phosphorus compound in the form of a phosphoric acid aqueous solution which is mixed with the calcined powder, in order to attain a high quality dielectric ceramic material, because the phosphorus is uniformly dispersed in the material.

The effects of the use of phosphorus on the properties will be explained.

When the $Ba(Mg_{\frac{1}{3}}Ta_{\frac{2}{3}})O_3$ powder is sintered without the addition of phosphorus at a temperature range from 1600° to 1700° C. for 4 to 8 hours at a heating rate of 200° C./hour, the relative density of the obtained sintered body is less than 80 to 85%, and thus the sintered body is not densified.

On the other hand, the $Ba(Mg_{\frac{1}{3}}Ta_{\frac{2}{3}})O_3$ dielectric ceramic material containing 0.005 to 1.0% by weight of phosphorus can be densified to a relative density of 88% or more under the same sintering conditions.

Since the relative density and the Q value are dependent on the sintering conditions such as the sintering temperature and time, the high Q value materials with a relative density of 95% or more are manufactured by controlling these condition. Further, to obtain materials with Q values of 15000 or more, an amount of 0.01 to 0.3% by weight of phosphorus is preferably added, as indicated in Table 1.

Where less than 0.005% by weight of phosphorus is contained, a relative density of 90% or more cannot be obtained even by sintering at a temperature of 1600° to 1700° C. On the other hand, where over 1.0% of phosphorus is contained, the relative density becomes 90% or less and the Q value is also lowered.

Therefore, in the present invention, the phosphorus content is limited within 0.005 to 1.0% by weight, resulting in the fabrication of well densified dielectric ceramic material.

In order to improve Q values of the dielectric ceramic materials, the process for the production of the dielectric ceramic material will be explained, as follows:

(a) Adding from 0.005 to less than 0.1% by weight of phosphorus to a calcined powder composed mainly of the $Ba(Mg_{\frac{1}{3}}Ta_{\frac{2}{3}})O_3$ complex perovskite phase, pressing and sintering at 1550° C. or more with a heating rate of less than 100° C./min, for 32 hours or less, (b) Succeedingly annealing at a temperature range from 1200° to lower than 1500° C. for 4 hours or more.

The reason why the amount of phosphorus is limited to from 0.005 to less than 0.1% by weight is that, if less than 0.005% by weight thereof is contained, a sufficient densification cannot be realized, and if 0.1% or more by weight is contained, the Q value is not so high.

Further, the reason why the heating rate is limited to less than 100° C./min is that, at a heating rate of 100°/min or more, the product properties are greatly scattered. Preferably, a heating rate of 1° to 5° C./min is used, as the product properties are then only slightly scattered.

Further, the material cannot be sufficiently densified at a sintering temperature of lower than 1550° C., and thus a sintering temperature of 1550° C. or more is required for up to 32 hours, preferably 8 hours or more. With a sintering time of 32 hours or more, a $BaTa_2O_6$ phase is generated and the Q value is lowered.

The sintering time is related to the sintering temperature, and densification can be realized in a shorter sintering time at a higher sintering temperature.

The reason for an annealing temperature of 1200° C. to lower than 1500° C. for 4 hours or more is that, by sufficiently increasing the regularity of the atomic arrangement of Mg and Ta ions in the $Ba(Mg_{\frac{1}{3}}Ta_{\frac{2}{3}})O_3$ crystal, and by reducing the lattice defects in the material, the dielectric ceramic material obtained has a very high Q value, i.e., 37000 at 10 GHz.

The term, the regularity of the $Ba(Mg_{\frac{1}{3}}Ta_{\frac{2}{3}})O_3$ crystal, means that Mg and Ta ions oriented at random coordinate to a position of the B site of the $ABO_3$ cubic perovskite structure and are rearranged to a regular atomic arrangement, e.g., Mg-Ta-Ta coordinates to the $<111>$ direction, with the result that the ordered domains having a hexagonal structure are generated. The amount of such ordered domains, resulting in the enhancement of the degree of ordered arrangement of the crystal are estimated by the degree of order of a $Ba(Mg_{\frac{1}{3}}Ta_{\frac{2}{3}})O_3$ complex perovskite compound. The degree of order is detected as an increase of the diffraction peak intensity of ordered lattice reflections, by X-ray diffractometry.

According to the present production process, the sintering process at 1550° C. or more and are annealing process at 1200° C. to lower than 1500° C. can be continuously carried out, or after the sintering process, the temperature can be lowered to a room temperature and succeedingly the annealing can be carried out.

BRIEF DESCRIPTION OF THE DRAWING

As seen in FIG. 1 (a), the complex perovskite $Ba(Mg_{\frac{1}{3}}Ta_{\frac{2}{3}})O_3$ phase is indexed based on the hexagonal ordered structure unit. On the other hand, the precipitation of a second phase of $BaTa_2O_6$ during sintering was confirmed from the X-ray diffraction profiles, as shown in FIG. 1 (b) and (c).

DESCRIPTION OF THE PREFERRED EMBODIMENTS

Figure 1:
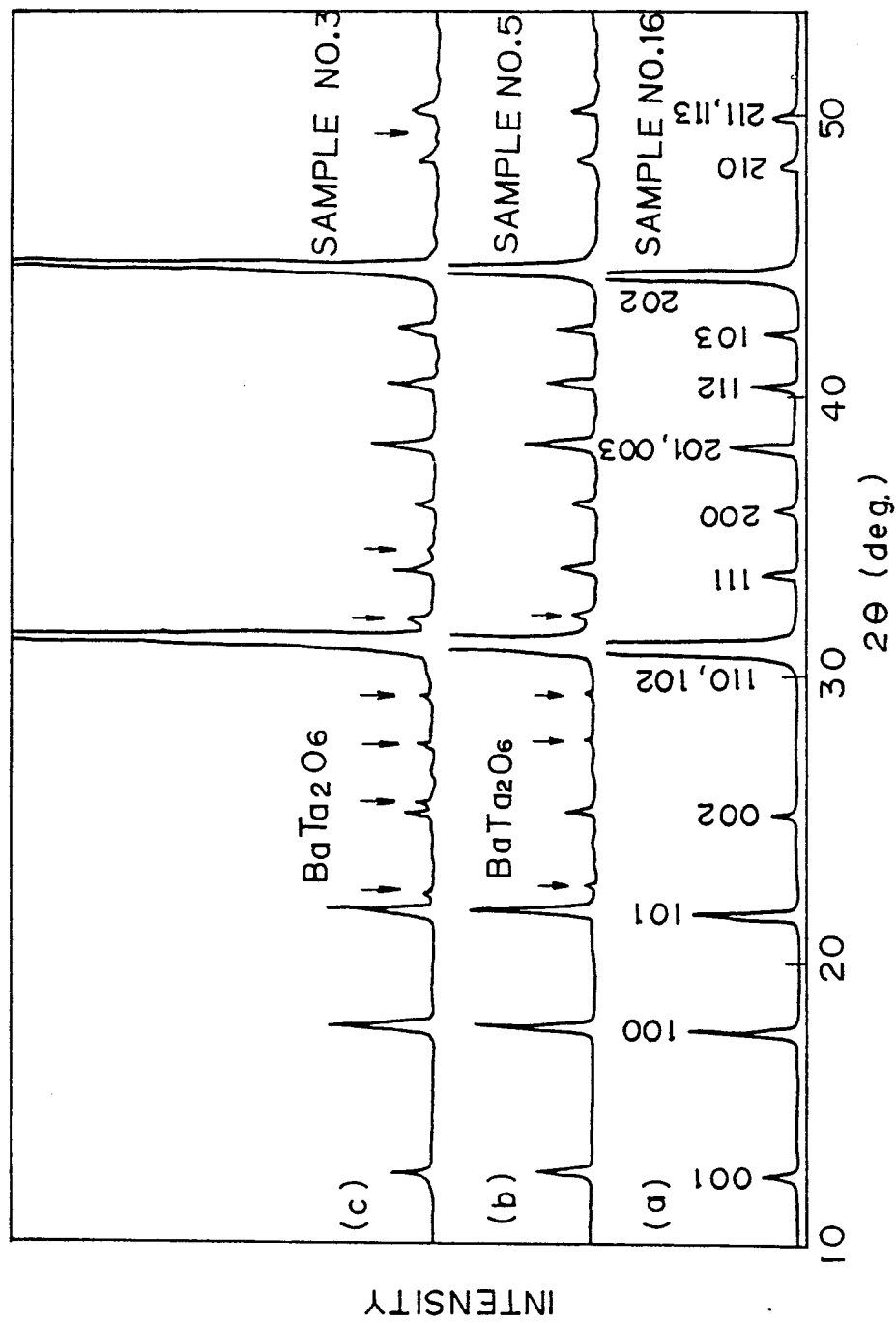
FIG. 1 (a), (b) and (c) show X-ray diffraction profiles taken from the sintered bodies of samples No. 3, 5 and 16, corresponding to Table 2, in order to identify their phases.

Examples of a preferred production process of a dielectric ceramic material according to the present invention will be given hereafter.

First, the desired amounts of a barium carbonate, a magnesium oxide, and a tantalum pentoxide are weighed, respectively, and then are wet-mixed with a solvent such as water or alcohol. The water or alcohol is then removed by a drying process. The dried mixed powder is roughly crushed and calcined at a temperature range from 900° to 1300° C. for four hours in air.

It was found that the mixed powder was reacted during the calcination, then the $Ba(Mg_{\frac{1}{3}}Ta_{\frac{2}{3}})O_3$ complex perovskite phase was mainly formed, but when the calcination temperature was lower, a $Ba_4Ta_2O_9$ phase was sometimes generated.

Next, a phosphoric acid aqueous solution is added to the calcined powder, and the mixture is dried again. In order to confirm the precise amount of the added phosphorus, compositional analysis of some sintered bodies was conducted by a chemical method. For example, when 0.07 and 0.64% by weight of phosphoric acid were added to the calcined powder it was found that 0.02 and 0.2% by weight of phosphorus are contained in the sintered bodies, respectively. Namely, even when phosphorus is added in the form of a phosphoric acid aqueous solution, the desired amount of phosphorus in the present ceramic material can be precisely controlled.

Then the phosphorus-containing calcined powder is granulated by an organic binder such as a polyvinyl alcohol, and pressed at a pressure range from 100 to 2000 kg/cm². The green body is sintered in the air at a heating rate of 200° C./hour, at a temperature range from 1300° to 1700° C. for 4 to 32 hours or more obtain a dielectric ceramic material according to the present invention. The dielectric ceramic material is used as a dielectric resonator by machining to a suitable dimension.

The dielectric ceramic material of the present invention also can be used as substrate materials for high frequency circuit or a microwave integrated circuits. Further, due to the small dielectric loss property, it can be applied as a material in various fields; for example, as a window material for a high frequency plasma furnace.

EXAMPLE 1

$BaCO_3$, MgO and $Ta_2O_5$ oxides with high grade of the purity were used as raw materials. Prior to the firing, the respective raw material powders were weighed so that the composition of the fired body became mainly that of $Ba(Mg_{\frac{1}{3}}Ta_{\frac{2}{3}})O_3$. The oxides weighed were mixed in an ethyl alcohol for 24 hours by a ball mill. Thereafter, using an evaporator, the mixture was dried and calcined for 4 hours at 1250° C. in the air. The most suitable calcination times and temperatures were changed in accordance with the amount of mixed powder and the size distribution of the mixed powder, in order to obtain the complex perovoskite $Ba(Mg_{\frac{1}{3}}Ta_{\frac{2}{3}})O_3$ single phase as the main compositon, whose identification is done by X-ray diffractometry.

Then a desired amount of phosphorus was added to a calcined powder in the form of a phosphoric acid aqueous solution and the mixed powder was dried again by an evaporator while being agitated.

The obtained powder was granulated by, if necessary, using an organic binder such as a polyvinyl alcohol (PVA), and pressed to a columnar shape at a pressure of 1000 kg/cm².

Thereafter, dielectric ceramic material of the present invention was obtained by sintering at a temperature range from 1500° to 1700° C. for 4 to 64 hours.

As comparative examples, $Ba(Mg_{\frac{1}{3}}Ta_{\frac{2}{3}})O_3$ sintered bodies were produced by the same process as mentioned above.

The dielectric properties were evaluated by working the obtained sintered bodies to a columnar shape with the dimensional ratio of about 0.4 length/diameter. The Q values and the relative permittivity were measured by the dielectric columnor resonator method based on the Hakki & Coleman method, in which the sample is mounted between two metal plates, and a variable frequency signal from a network analyzer is applied to the sample via a coaxial line and excites a field in it. The temperature coefficient of the resonant frequency was measured by the dielectric cavity resonator method.

The properties of the dielectric resonators produced by above-mentioned methods, in which the amount of phosphorus added is from 0.005 to 1.0% by weight, are summarized in Table 1.

As shown in Table 1, the dielectric ceramic material containing 0.01 to 0.4% by weight of phosphorus have relative densities of 95% or more. Particularly, the dielectric ceramics materials containing 0.02 to 0.05% by weight of phosphorus have high Q values of 20000 or more at 10 GHz.

Temperature coefficients of the resonant frequency measured to be about 4 ppm/°C. in samples No. 3, 4, 6, 7 and 9, by setting each sample in an open air bath equipped with a thermostat. By use of $CO_2$ gas for cooling, the measuring temperature ranges from 25° to 80° C.

TABLE 1

| Sample No. | Amount of P (wt %) | sintering process | | | annealing | | relative density of sintered body (%) | relative permittivity | Q value (at 10 GHz) | scattering of dielectric property | second phase | temperature coefficient of resonant frequency |
|---|---|---|---|---|---|---|---|---|---|---|---|---|
| | | heating rate (°C./min) | temperature (°C.) | time (hour) | temperature (°C.) | time (hour) | | | | | | |
| 1 | 0.0 | 3 | 1600 | 32 | — | — | 85.0 | — | — | — | — | — |
| 2 | 0.005 | 3 | 1600 | 32 | — | — | 92.1 | 21.8 | 1500 | Δ | — | — |
| 3 | 0.01 | 3 | 1600 | 64 | — | — | 97.7 | 23.7 | 14500 | ○ | — | 4.1 |
| 4 | 0.02 | 3 | 1600 | 64 | — | — | 96.8 | 23.5 | 21050 | ○ | — | 4.3 |
| 5 | 0.03 | 3 | 1700 | 32 | — | — | 97.9 | 23.8 | 18870 | ○ | — | — |
| 6 | 0.04 | 3 | 1700 | 32 | — | — | 98.2 | 24.2 | 21100 | ○ | — | 4.1 |
| 7 | 0.05 | 3 | 1700 | 32 | — | — | 99.2 | 24.8 | 22500 | ○ | — | 4.0 |
| 8 | 0.09 | 3 | 1600 | 32 | — | — | 95.2 | 22.5 | 18640 | ○ | — | — |
| 9 | 0.13 | 3 | 1600 | 32 | — | — | 97.9 | 23.8 | 18700 | ○ | — | 3.8 |
| 10 | 0.27 | 3 | 1600 | 32 | — | — | 97.7 | 23.6 | 14300 | ○ | — | — |
| 11 | 0.40 | 3 | 1600 | 4 | — | — | 95.0 | 22.9 | 6400 | Δ | — | — |
| 12 | 0.52 | 3 | 1600 | 4 | — | — | 91.0 | 22.0 | 3200 | Δ | — | — |
| 13 | 0.65 | 3 | 1600 | 4 | — | — | 90.0 | 21.0 | 2500 | Δ | — | — |
| 14 | 1.00 | 3 | 1600 | 4 | — | — | 88.8 | 20.5 | 1500 | Δ | — | — |

EXAMPLE 2

$BaCO_3$, $MgCO_3$ and $Ta_2O_5$ oxides with high grade of purity were used as the raw materials and a calcined powder whose main composition was complex perovskite $Ba(Mg_{\frac{1}{3}}Ta_{\frac{2}{3}})O_3$ phase was produced by the same process as described in Example 1.

Then a desired amount of phosphoric acid aqueous solution and a polyvinyl alcohol were added to the calcined powder, and the calcined powder was granulated.

The granulated powder was press-moulded at a pressure of 2000 kgf/cm² to a columnar shape. The obtained green body was heated at a heating rate of 1° to 160° C./min to a temperature of 1450° to 1700° C., and sintered at constant temperature for 2 to 64 hours. The sintered body was then cooled to a temperature in the range 1100° to 1450° C., and kept there for 2 to 128 hours.

The density of the sintered body was measured by the Archimedes method, and after the sintered body was machined, the relative permittivity and Q values (at 10 GHz), and the temperature coefficient of a resonant frequency were measured by the method mentioned in Example 1. Further, identification of the second phase was performed using X-ray diffractometry.

The results are shown in Table 2.

As shown in Table 2, the marks * are out of the scope of the present invention.

Since a phosphoric acid aqueous solution was not added to the sample No. 1, the sample was not well sintered. Further, for the sample No. 2, the sintering temperature was low, and thus the relative density did not sufficiently increase. In samples No. 3 to 5, since the sintering temperature is too high, or the sintering time was too long, the second phase of $BaTa_2O_6$ was precipitated, resulting in the low Q values.

In samples No. 6 to 8, the relative density was increased and the second phase was not generated, but an annealing process was not carried out, so that the annealing process was not carried out, since the degree of order in the $Ba(Mg_{\frac{1}{3}}Ta_{\frac{2}{3}})O_3$ crystal was not sufficient and the Q value was low. Since the heating rate was too high in samples No. 12 and 13, the deviation of the dielectric properties was large. In sample No. 17, the sintering time was so long, that the second phase $BaTa_2O_6$ was precipitated, and thus even if the annealing was carried out, the Q value was not increased.

Since the amount of the added phosphate was too large in sample 21, the Q value was not sufficiently increased. Since in the samples 24 and 25 the annealing process was too high or too low, the Q value was low. Further, since the annealing time was short in sample No. 26, the Q value was not sufficiently increased.

Consequently, as seen in the case of sample No. 16, the dielectric ceramic material having a maximum Q value of 37120 at 10 GHz was obtained by the suitable annealing treatment after the sintering process, on which the precipitation of second phase of $BaTa_2O_6$ was suppressed. The temperature coefficient of the resonant frequency was about 4 ppm/°C.

TABLE 2

| Sample No. | Amount of P (wt %) | sintering process | | | annealing | | relative density of fired body (%) | relative permittivity | Q value (at 10 GHz) | scattering of dielectric property | second phase | temperature coefficient of resonant frequency |
| | | heating rate (°C./min) | temperature (°C.) | time (hour) | temperature (°C.) | time (hour) | | | | | | |
| --- | --- | --- | --- | --- | --- | --- | --- | --- | --- | --- | --- | --- |
| 1* | 0 | 3 | 1600 | 16 | — | — | 60 | — | — | — | x | — |
| 2* | 0.02 | 3 | 1450 | 32 | — | — | 85 | 19.5 | 2450 | — | x | — |
| 3* | 0.02 | 3 | 1700 | 32 | — | — | 96 | 23.4 | 10250 | — | ○ | — |
| 4* | 0.02 | 3 | 1600 | 32 | — | — | 97 | 23.9 | 14520 | — | ○ | — |
| 5* | 0.02 | 3 | 1600 | 64 | — | — | 96 | 23.6 | 9260 | — | ○ | — |
| 6* | 0.02 | 3 | 1700 | 4 | — | — | 98 | 24.0 | 8560 | — | x | — |
| 7* | 0.02 | 3 | 1600 | 16 | — | — | 98 | 24.0 | 8350 | — | x | — |
| 8* | 0.02 | 50 | 1600 | 16 | — | — | 98 | 24.1 | 20120 | — | x | — |
| 9 | 0.02 | 1 | 1600 | 16 | 1450 | 64 | 98 | 24.1 | 28650 | ○ | x | — |
| 10 | 0.02 | 5 | 1600 | 16 | 1450 | 64 | 98 | 24.2 | 27920 | ○ | x | — |
| 11 | 0.02 | 50 | 1600 | 16 | 1450 | 128 | 98 | 24.0 | 35440 | △ | x | — |
| 12* | 0.02 | 100 | 1600 | 16 | 1450 | 128 | 98 | 24.3 | 32000 | x | x | — |
| 13* | 0.02 | 160 | 1600 | 16 | 1450 | 128 | 97 | 24.2 | 30000 | x | x | — |
| 14 | 0.02 | 3 | 1650 | 8 | 1450 | 128 | 98 | 24.2 | 34450 | ○ | x | — |
| 15 | 0.02 | 3 | 1600 | 16 | 1450 | 64 | 98 | 24.1 | 26600 | ○ | x | — |
| 16 | 0.02 | 3 | 1600 | 16 | 1450 | 128 | 98 | 23.9 | 37120 | ○ | x | 3.68 |
| 17* | 0.02 | 3 | 1600 | 32 | 1450 | 64 | 98 | 24.0 | 19000 | △ | x | 3.68 |
| 18 | 0.005 | 3 | 1600 | 16 | 1450 | 128 | 97 | 23.0 | 25600 | ○ | x | — |
| 19 | 0.01 | 3 | 1600 | 16 | 1450 | 128 | 98 | 24.0 | 31500 | ○ | x | 3.80 |
| 20 | 0.05 | 3 | 1600 | 16 | 1450 | 128 | 98 | 24.0 | 29800 | ○ | x | 3.20 |
| 21* | 0.1 | 3 | 1600 | 16 | 1450 | 128 | 98 | 23.9 | 22430 | △ | x | — |
| 22 | 0.05 | 3 | 1600 | 16 | 1450 | 8 | 98 | 23.9 | 25120 | ○ | x | — |
| 23 | 0.02 | 3 | 1600 | 16 | 1200 | 128 | 98 | 24.0 | 30020 | ○ | x | — |
| 24* | 0.02 | 3 | 1600 | 16 | 1500 | 128 | 93 | 23.0 | 4360 | x | ○ | — |
| 25* | 0.02 | 3 | 1600 | 16 | 1100 | 128 | 97 | 23.8 | 10520 | ○ | x | — |
| 26* | 0.02 | 3 | 1600 | 16 | 1450 | 2 | 98 | 24.1 | 11230 | ○ | x | — |

We claim:

1. A dielectric ceramic material consisting essentially of a complex perovskite $Ba(Mg_{\frac{1}{3}}Ta_{\frac{2}{3}})O_3$ phase, and phosphorus in an amount of 0.005 to 1.0% by weight.

2. A dielectric ceramic material according to claim 1, which contains 0.01 to 0.3% by weight of phosphorus and has a relative density of 95% or more and a Q value of 14000 or more.

3. A dielectric ceramic material according to claim 1, which contains 0.02 to 0.05% by weight of phosphorus and has a Q value of 20000 or more at a measuring frequency of 10 GHz.

4. A method of producing a dielectric ceramic material, comprising the steps of:
  (a) calcining compounds of barium, magnesium and tantalum at a temperature of from 900° to 1300° C. in an atmosphere to synthesize calcined powder consisting essentially of a complex perovskite $Ba(Mg_{\frac{1}{3}}Ta_{\frac{2}{3}})O_3$ phase,
  (b) adding from 0.005 to 1.0% by weight of phosphorus to said calcined powder by treating said powder with an aqueous phosphoric acid solution, and (c) pressing the resultant phosphorus-containing oxide powder to form a green body, and sintering the green body at a temperature of from 1550° to 1700° C. for 4 hours or more at a heating rate of less than 100° C./min.

5. A method according to claim 4, wherein said sintering is carried out for 4 to 32 hours, and after said sintering, annealing is carried out at a temperature of from 1200° C. to below 1500° C. for 4 hours or more.

6. A method according to claim 4, wherein 0.01 to 0.3% by weight of phosphorus is added to said calcined powder, and the dielectric ceramic material has a relative density of 95% or more and a Q value of 15000 or more.

7. A method according to claim 4, wherein 0.02 to 0.05% by weight of phosphorus is added to said calcined powder, and the dielectric ceramic material has a Q value of 20000 or more at a measuring frequency of 10 GHz.

8. A method according to claim 4, wherein said compounds are $BaCO_3$, MgO or $MgCO_3$, and $Ta_2O_5$.

9. A method according to claim 4, wherein said sintering is carried out at a heating rate less than 100° C./min, and a sintering time of 4 to 64 hours.

10. A method according to claim 4, wherein said heating rate is from 1° to 5° C./min.

* * * * *